(12) United States Patent
Chun et al.

(10) Patent No.: US 8,932,791 B2
(45) Date of Patent: Jan. 13, 2015

(54) LIQUID ELECTROPHOTOGRAPHIC INK AND METHOD FOR MAKING THE SAME

(75) Inventors: Doris Pik-Yiu Chun, Santa Clara, CA (US); Hou T. Ng, Campbell, CA (US); Albert Teishev, Rishon le-zion (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/982,215

(22) PCT Filed: Jan. 31, 2011

(86) PCT No.: PCT/US2011/023244
§ 371 (c)(1),
(2), (4) Date: Jul. 26, 2013

(87) PCT Pub. No.: WO2012/105951
PCT Pub. Date: Aug. 9, 2012

(65) Prior Publication Data
US 2013/0302733 A1    Nov. 14, 2013

(51) Int. Cl.
*G03G 9/12* (2006.01)
*G03G 9/08* (2006.01)
*G03G 9/125* (2006.01)
*G03G 9/13* (2006.01)
*G03G 9/135* (2006.01)
*C09D 11/03* (2014.01)

(52) U.S. Cl.
CPC .............. *G03G 9/0804* (2013.01); *G03G 9/122* (2013.01); *G03G 9/125* (2013.01); *G03G 9/13* (2013.01); *G03G 9/135* (2013.01); *C09D 11/03* (2013.01)

USPC .......................................... 430/114

(58) Field of Classification Search
USPC .......................................... 430/114
See application file for complete search history.

(56) References Cited

U.S. PATENT DOCUMENTS

| | | |
|---|---|---|
| 4,794,651 A | 12/1988 | Landa et al. |
| 4,842,974 A | 6/1989 | Landa et al. |
| 5,026,427 A | 6/1991 | Mitchell et al. |
| 5,047,306 A | 9/1991 | Almog |
| 5,047,307 A | 9/1991 | Landa et al. |
| 5,147,744 A | 9/1992 | Sacripante et al. |
| 5,192,638 A | 3/1993 | Landa et al. |
| 5,208,130 A | 5/1993 | Almog et al. |
| 5,225,306 A | 7/1993 | Almog et al. |
| 5,264,313 A | 11/1993 | Landa et al. |

(Continued)

FOREIGN PATENT DOCUMENTS

| | | |
|---|---|---|
| JP | 05-313401 | 11/1993 |
| JP | 2004110006 | 4/2004 |

(Continued)

OTHER PUBLICATIONS

Kim et al., "Microencapsulation of Electrophoretic TiO2 Nanoparticles for Electronic Ink", Mol. Cryst. Liq. Cryst., vol. 445, pp. 43/[333]-48/[338], 2006.

(Continued)

*Primary Examiner* — Hoa V Le

(57) ABSTRACT

A liquid electrophotographic ink is disclosed herein. One example of the liquid electrophotographic ink includes a non-polar carrier liquid; pigmented toner particles; a charge director; and polymer resin encapsulated metal oxide nanoparticles. A method for making the liquid electrophotographic ink is also disclosed herein.

14 Claims, 6 Drawing Sheets

(56) References Cited

U.S. PATENT DOCUMENTS

| | | |
|---|---|---|
| 5,266,435 A | 11/1993 | Almog |
| 5,286,593 A | 2/1994 | Landa et al. |
| 5,300,390 A | 4/1994 | Landa et al. |
| 5,345,296 A | 9/1994 | Wellings |
| 5,346,796 A | 9/1994 | Almog |
| 5,407,771 A | 4/1995 | Landa et al. |
| 5,530,533 A | 6/1996 | Wallace |
| 5,554,476 A | 9/1996 | Landa et al. |
| 5,655,194 A | 8/1997 | Landa et al. |
| 5,679,138 A | 10/1997 | Bishop et al. |
| 5,792,584 A | 8/1998 | Almog |
| 5,923,929 A | 7/1999 | Ben Avraham et al. |
| 6,146,803 A | 11/2000 | Landa et al. |
| 7,402,614 B2 | 7/2008 | Marguerettaz et al. |
| 7,749,299 B2 | 7/2010 | Vanheusden et al. |
| 2006/0023041 A1 | 2/2006 | Brenner et al. |
| 2006/0194138 A1 | 8/2006 | Regev et al. |
| 2007/0197684 A1* | 8/2007 | Yamashita et al. ............ 523/160 |
| 2007/0279182 A1 | 12/2007 | Kodas et al. |
| 2008/0262122 A1 | 10/2008 | Ueno et al. |
| 2008/0275163 A1 | 11/2008 | Liu |
| 2009/0258156 A1* | 10/2009 | Chretien et al. .............. 427/532 |

FOREIGN PATENT DOCUMENTS

| | | |
|---|---|---|
| WO | WO 93/11471 | 6/1993 |
| WO | WO 98/44058 | 10/1998 |
| WO | WO 2008/022760 | 2/2008 |
| WO | WO 2008/054386 A1 | 5/2008 |
| WO | WO 2010/053480 | 5/2010 |

OTHER PUBLICATIONS

BYK Additives & Instruments, "Nanotechnology Additives", Published 2007.

International Search Report and Written Opinion for PCT/US2011/023244 dated Oct. 24, 2011 (8 pages).

* cited by examiner

Control

2% Zirconium

5% Zirconium

2% Zinc Oxide

LIQUID ELECTROPHOTOGRAPHIC INK AND METHOD FOR MAKING THE SAME

BACKGROUND

The present disclosure relates generally to liquid electrophotographic ink and a method for making the same.

The global print market is in the process of transforming from analog printing to digital printing. Electrophotographic printing is one example of a digital printing technique. Electrophotographic printing refers to a process that provides an ink image that is electrostatically transferred from a photo imaging plate to an intermediate drum or roller, and then thermally transferred to a substrate, or to a process where the ink image is electrostatically transferred from the photo imaging plate directly onto a substrate. In one example, the photo imaging plate is a photoconductive surface that is used to develop a hardcopy of the image. The photoconductive surface is selectively charged with a latent electrostatic image having both image and background areas. In one example, a liquid ink, which includes charged toner particles in a carrier liquid, is brought into contact with the selectively charged photoconductive surface. The charged toner particles adhere to the image areas of the latent image while the background areas remain free of ink. A hardcopy material (e.g., paper or other print substrate) is brought directly or indirectly into contact with the photo-conductive surface in order to transfer the latent image. Variations of electrophotographic printing utilize different methods for forming the electrostatic latent image on a photoreceptor or on a dielectric material.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
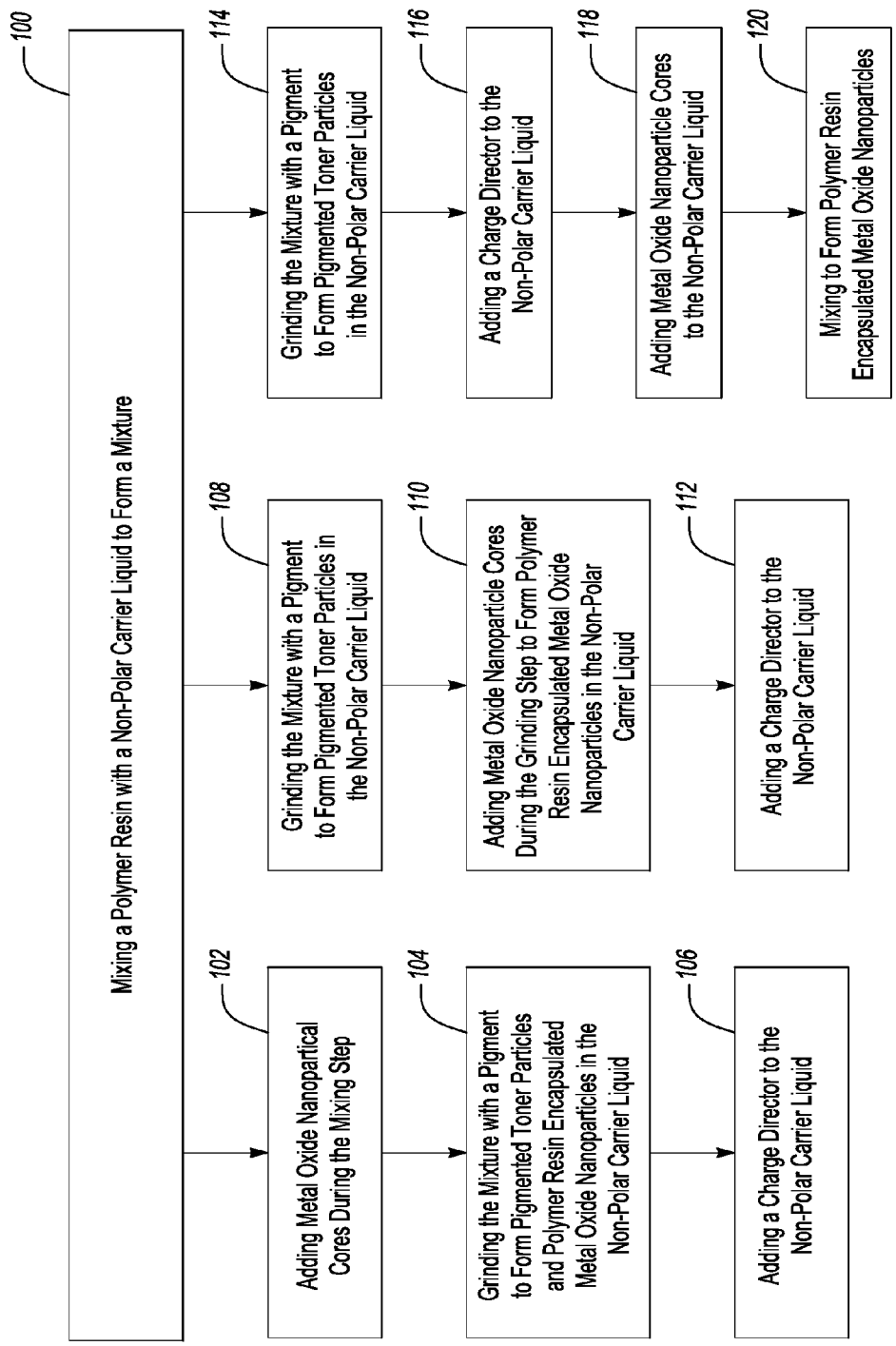
FIG. 1 is a flow diagram illustrating examples of a method for forming an example of the liquid electrophotographic ink.

Examples of the electrophotographic ink disclosed herein include metal oxide nanoparticle cores, which are believed to become encapsulated by polymer resin throughout processing of the ink. The metal oxide nanoparticle cores may be added and encapsulated during ink production, and thus additional processing steps are not required to generate the ink. The addition of the polymer resin encapsulated metal oxide nanoparticles to the ink enhances print durability without altering the loading of other ink components or deleteriously affecting the electrical properties of the ink or the optical density of the resulting ink films. The polymer resin encapsulated metal oxide nanoparticles enhance print durability, for example, by reinforcing the resulting ink films against abrasive scratches. Improved scratch resistance eliminates, in some instances, the need for an overcoat, which decreases the number of steps to form a final print and may reduce energy consumption during printing processing.

Examples of the liquid electrophotographic ink disclosed herein includes a non-polar carrier liquid, pigmented toner particles, a charge director, and polymer resin encapsulated metal oxide nanoparticles. Each of these components will be described further in reference to FIG. 1, which illustrates various examples of the method for forming the liquid electrophotographic ink.

As shown at reference numeral 100, each example of the method begins by mixing a polymer resin with the non-polar carrier liquid to form a mixture.

In one example, the polymer resin is a thermoplastic polymer. Thermoplastic polymers soften and swell in the carrier liquid during processing, which contributes to the polymer resin encapsulating the pigment particles and/or the metal oxide nanoparticle cores. Examples of the polymer resin include ethylene acid copolymers; ethylene acrylic acid copolymers; methacrylic acid copolymers; ethylene vinyl acetate copolymers; copolymers of ethylene (60 to 99.9%), acrylic, or methacrylic acid (40 to 0.1%) and alkyls (C1 to C20)); esters of methacrylic or acrylic acid (0.1 to 20%); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g., copolymer of acrylic or methacrylic acid and at least one alkyl ester of acrylic or methacrylic acid where the alkyl is from 1 to about 20 carbon atoms, such as methyl methacrylate (50% to 90%)/methacrylic acid (0% to 20%)/ethylhexylacrylate (10% to 50%)); ethylene-acrylate terpolyrners; ethylene-acrylic esters-maleic anhydride (MAH) or glycidyl methacrylate (GMA) terpolyrners; low molecular weight ethylene-acrylic acid ionomers (i.e., those having a molecular weight less than 1000 amu), and combinations thereof. In an example, the polymer resin is selected from the NUCREL® or BYNEL® family of polymers (available from DuPont, e.g., NUCREL® 403, NUCREL® 407, NUCREL® 609HS, NUCREL® 908HS, NUCREL® 1202HC, NUCREL® 30707, NUCREL® 1214, NUCREL® 903, NUCREL® 3990, NUCREL® 910, NUCREL® 925, NUCREL® 609, NUCREL® 599, NUCREL® 960, NUCREL® RX 76, NUCREL® 2806, BYNEL® 2002, BYNEL® 2014, and BYNEL® 2020), the ACLYN® family of polymers (available from Honeywell, e.g., ACLYN® 201, ACLYN® 246, ACLYN® 285, and ACLYN® 295), and the LOTADER® family of polymers (available from Arkema, e.g., LOTADER® 2210, LOTADER® 3430, and LOTADER® 8200). In some instances, the polymer resin has —COOH surface groups. Any of the listed polymer resins may be used alone, or a combination of two or more of the listed polymer resins may also be used.

The amount of polymer resin(s) used may range from 5% to 25% by total weight of the ink.

The non-polar carrier liquid acts as a dispersing medium for the other components in the liquid electrophotographic ink. Generally, the non-polar carrier liquid has properties such as low odor, lack of color, selective solvency, oxidation stability, low electrical conductivity, low surface tension, desirable wetting, spreadability, low viscosity, narrow boiling point range, non-corrosive to metals, low freezing point, high electrical resistivity, high interfacial tension, low latent heat of vaporization, and low photochemical reactivity. Examples of non-polar carrier liquids include dielectric liquids, non-oxidative water immiscible liquids (e.g., petroleum distillates), hydrocarbon-based carriers (e.g., aliphatic—i.e., linear/acyclic or cyclic - hydrocarbons, branched-chain aliphatic hydrocarbons, etc.), silicone oil, soy bean oil, vegetable oil, plant extracts, etc. In one example, the non-polar carrier liquid is an alkane or a cycloalkane having from 6 to 14 carbon atoms (e.g., n-hexanes, heptanes, octane, dodecane, cyclohexane etc.), t-butylbenzene, or 2,2,4-trimethylpentane. In another example, the non-polar carrier liquid is selected from paraffins and isoparaffins. Examples of isoparaffins include those in the ISOPAR® family (Exxon Mobil Corp.), including ISOPAR® G, ISOPAR® H, ISOPAR® K, ISOPAR® L, and ISOPAR® M. Other hydrocarbons that may be used as the non-polar carrier liquid include those bearing the trade name SOLTROL® (available from Chevron Phillips Chemical Company) or SHELLSOL® (available from Shell Chemicals). Any of the listed non-polar carrier liquids may be used alone, or a combination of two or more of the listed non-polar carrier liquid may also be used.

The amount of non-polar carrier liquid used depends at least upon the amount of polymer resin(s) used. In one example, the amount of non-polar carrier liquid used may range from 75% to 90% by total weight of the ink.

Mixing may be accomplished using any suitable equipment (e.g., a double planetary mixer). The polymer resin and the non-polar carrier liquid may be mixed at a speed and for a time suitable to form a homogeneous composition (e.g., as observed by the human eye). In one example, mixing is accompanied by heating. Heating is accomplished at a temperature that is above the highest melting point of the polymer resin(s) used. In another example, mixing is initially performed at a temperature that is above the highest melting point of the polymer resin(s) used, and the temperature is reduced and mixing is continued until the mixture reaches room temperature.

As illustrated in FIG. 1, the mixing step may be followed by various steps. One example of the method is shown at reference numerals 102 through 106, another example of the method is shown at reference numerals 108 through 112, and this another example of the method is shown at reference numerals 114 through 120.

In the first example of the method (see reference numeral 102), metal oxide nanoparticles (also referred to herein as metal oxide nanoparticle cores) are added to the mixture during the mixing of the polymer resin and the non-polar carrier liquid. In the examples disclosed herein, the metal oxide nanoparticle cores have a hardness that is greater than a hardness of the polymer resin(s) that is/are used. In one example, the metal oxide nanoparticle cores are selected from zinc oxide, indium tin oxide (ITO), zirconium oxide, titanium dioxide, aluminum oxide, and mixtures thereof. In one example, the metal oxide nanoparticle cores have an unmodified surface (e.g., the surface remains non-functionalized, additional groups are not reacted with the native surface groups, etc.). The amount of metal oxide nanoparticle cores added is up to 5% of the total weight of the ink. In one example, the amount of metal oxide nanoparticle cores ranges from about 0.5% to about 5% by total weight of the ink.

The metal oxide nanoparticle cores do not alter the electrical properties of the resulting ink. It is believed that the metal oxide nanoparticle cores are encapsulated throughout the process, and that the encapsulation process renders the metal oxide nanoparticles relatively non-conducting. For example, conducting ITO nanoparticle cores become non-conducting as a result of the polymer resin(s) coating established thereon. Maintaining the electrical properties of the ink enables the ink to develop in a desirable manner.

As shown at reference numeral 104 in FIG. 1, the mixture including the polymer resin(s), the metal oxide nanoparticle cores, and the non-polar carrier liquid is ground with a pigment.

The pigment may be selected from organic pigment particles or inorganic pigment particles, and these particles may have any particle size that allows the composition including the pigment to be printed from the digital printer. During processing, the pigment(s) become encapsulated by the polymer resin. In one example, the final particle size (i.e., the diameter of resin-encapsulated pigment particles) ranges from about 500 nm to about 5 µm. In another example, the average final particle size is about 2 µm. When metallic or pearlescent pigments are utilized, the final particle size may be up to 20 µm. Since the size of the pigments may be reduced during processing, it is to be understood that the starting size of the pigment(s) may be larger than those listed herein.

Organic or inorganic pigment particles may be selected from black pigment particles, yellow pigment particles, magenta pigment particles, red pigment particles, cyan pigment particles, blue pigment particles, green pigment particles, orange pigment particles, brown pigment particles, and white pigment particles. In some instances, the organic or inorganic pigment particles may include spot-color or specialty pigment particles. Spot-color pigments are formed from a combination of a predefined ratio of two or more primary color pigment particles. Specialty pigments may, e.g., be metallic, fluorescent and/or opalescent pigments.

An example of a suitable inorganic black pigment includes carbon black. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Georgia, (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, and REGAL® 660R); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of suitable yellow pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, C.I. Pigment Yellow 180, and C.I. Pigment Yellow 185.

Examples of suitable magenta or red organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of blue or cyan organic pigments include C.I. Pigment Blue 1, C.I. Pigment Blue 2, C.I. Pigment Blue 3, C.I. Pigment Blue 15, C.I. Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Suitable examples of green organic pigments include C.I. Pigment Green 1, C.I. Pigment Green 2, C.I. Pigment Green, 4, C.I. Pigment Green 7, C.I. Pigment Green 8, C.I. Pigment Green 10, C.I. Pigment Green 36, and C.I. Pigment Green 45.

Still further, examples of brown organic pigments include C.I. Pigment Brown 1, C.I. Pigment Brown 5, C.I. Pigment Brown 22, C.I. Pigment Brown 23, C.I. Pigment Brown 25, and C.I. Pigment Brown, C.I. Pigment Brown 41, and C.I. Pigment Brown 42.

Examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

In another example, the pigment may be selected from metallic pigments, where the metallic pigments also have a particle size enabling the final print-ready ink to be printed from the electrophotographic printer. In an example, the final particle size of the metallic pigment ranges from about 0.01 µm to about 20 µm. Suitable metallic pigments include, but are not limited to, a metal selected from gold, silver, platinum, nickel, chromium, tin, zinc, indium, titanium, copper, aluminum, and alloys of any of these metals. These metals may be used alone or in combinations with two or more metals or metal alloys. Non-limiting examples of metallic pigments include Standard RO100, Standard RO200, and DORADO PX™ 4001 (available from Eckart Effect Pigments, Wesel, Germany).

In yet another example, the pigment may be selected from a pearlescent pigment (also known as an opalescent pigment), where the pearlescent pigments have a particle size that enable the composition to be printed from the digital printer. In an example, the final pearlescent particle size ranges from about 0.01 µm to about 20 µm. It is to be understood that suitable pearlescent pigments are those that tend to exhibit various colors depending on the angle of illumination and/or of viewing. Non-limiting examples of pearlescent pigments include those of the PRESTIGE® series and of the DORADO PX™ series, both of which are available from Eckart Effect Pigments.

A single pigment or a mixture of two or more pigments may be utilized. The pigment(s) is/are added in any suitable amount ranging from about 3% to about 8% of the total weight of the ink.

In this example, the combination of mixing and grinding results in the formation of both pigmented toner particles and polymer resin encapsulated metal oxide nanoparticles. As used herein, the term "pigmented toner particle" refers to pigment(s) that have a coating of the polymer resin(s) thereon (i.e., pigments that are encapsulated by polymer resin(s)). Pigmented toner particles have a pigment core and polymer resin shell. In some instances, the polymer resin coating/shell is permanently established on the pigment core 12, such that the polymer resin coating/shell non-reversibly encapsulates the pigment. This is in contrast to thermodynamically reversible coatings such as, e.g., those formed in self-assembling processes. The permanent establishment may be accomplished via covalent bonding when the polymer resin(s) chemically react with the pigment. The polymer resin coating/shell may otherwise be attached to the pigment through physical bonding, such as, e.g., through hydrogen bonding, Van der Waals interactions, Zwitterionic interactions, or the like. Also as used herein, the term "polymer resin encapsulated metal oxide nanoparticles" refers to metal oxide nanoparticle cores that have a coating of the polymer resin(s) thereon. During grinding (or other processes as described below), hot spots (e.g., several hundreds of degrees) may form between the surface groups of the metal oxide nanoparticle cores (e.g., hydroxyl (—OH) groups) and the surface groups of the polymer resin(s) (e.g., carboxyl (—COOH) groups). The heat is believed to initiate a chemical reaction between the respective surface groups, which can result in hydrogen bonding between the groups. The hydrogen bonds attach the polymer resin(s) to the metal oxide nanoparticle cores to form the polymer resin encapsulated metal oxide nanoparticles. Alternatively, the extreme high temperature of the hot spots may also facilitate esterification of the surface hydroxyl (—OH) groups with the surface carboxylic acid (—COOH) groups to form the corresponding ester linkage. The ester bonds, if formed, attach the polymer resin(s) to the metal oxide nanoparticle cores to form the polymer resin encapsulated metal oxide nanoparticles.

The grinding step may be accomplished in different equipment than the mixing step, and thus, in one example, the mixture and the pigment(s) are both added to a grinder (e.g., a ball attritor). In one example, grinding takes place at lower temperature(s) than mixing. In some instances, grinding may take place at multiple temperatures. For example, grinding may initially occur for a first predetermined time at a first temperature, and then grinding may continue for a second predetermined time at a second temperature that is lower than the first temperature. As an example, grinding may initially occur for 2 hours at 55° C. and then grinding may be continued for 10 hours at 40° C. In still another example, grinding takes place in the presence of cooling. For example, grinding may be accomplished for about 24 hours with water cooling (~20° C.).

After grinding is complete, a charge director is added to the non-polar carrier liquid having the particles therein (as shown at reference numeral 106). A charge director attaches to and imparts a charge to the pigmented toner particles. Examples of suitable charge directors include lecithin, oil-soluble petroleum sulfonates (e.g., neutral calcium petronate, neutral barium petronate, and basic barium petronate), polybutylene succinimides (e.g., OLOA 1200), glyceride salts (e.g., sodium salts of phosphated mono- and diglycerides with unsaturated and saturated acid substituents), sulfonic acid salts (e.g., barium, sodium, calcium, and aluminum salts of sulfonic acid), oxyphosphate metal salts, or mixtures/combinations thereof. The sulfonic acids may include alkyl sulfonic acids (e.g., alkyl-benzenesulfonic acid), aryl sulfonic acids, sulfonic acids of alkyl succinates, and mixtures/combinations thereof. The amount of charge director will depend, at least in part, upon the total weight of the pigmented toner particles that are present in the non-polar carrier liquid. In one example, the charge director is added in an amount ranging from about 1% to about 10% of the total weight of the pigmented toner particles.

The charge director may be added directly to the non-polar carrier liquid having the particles therein, or it may be dissolved in additional non-polar carrier liquid and then added to the non-polar carrier liquid having the particles therein. Once the charge director is added, the mixture may be mixed until a homogeneous mixture (e.g., as observed by the human eye) is obtained.

While not shown in FIG. 1, this example of the method may also include adding additional non-polar carrier liquid to the mixture in order to form the final ink in which the particles are dispersed in the non-polar carrier liquid. This may be desirable, for example, to decrease the non-volatile solids (NVS) content of the ink. Additional non-polar carrier liquid may be added before or after the charge director is added. The additional amount of non-polar carrier liquid added to obtain the final ink is enough to render the non-volatile solids content of the final ink such that it is within the range from 2% to 3%.

In the second example of the method shown in FIG. 1 (see reference numeral 108), after the mixture is formed (see reference numeral 100), the mixture is ground with the pigment. The grinding process (i.e., equipment used, conditions used, etc.) may be accomplished as previously described. It is to be understood that the pigment(s) may be selected from those previously described and may be added in an amount previously described. The grinding of the mixture with the pigment(s) results in the formation of the pigmented toner particles.

This example of the method involves adding the metal oxide nanoparticle cores to the grinder as grinding occurs, as shown at reference numeral 110. The pigment(s) and mixture may be ground for some time before the addition of the metal oxide nanoparticle cores, or the metal oxide nanoparticle cores may be added at the beginning of the grinding process. It is to be understood that the metal oxide nanoparticle cores may be selected from those previously described and may be added in an amount previously described. The grinding of the mixture with the metal oxide nanoparticle cores results in the formation of the polymer resin encapsulated metal oxide nanoparticles.

After grinding is complete, the charge director is added to the non-polar carrier liquid having the particles (i.e., the pigmented toner particles and the polymer resin encapsulated metal oxide nanoparticles) therein (as shown at reference numeral 112). It is to be understood that the charge director may be selected from those previously described and may be added in an amount previously described.

While not shown in FIG. 1, this example of the method may also include adding additional non-polar carrier liquid to the mixture in order to form the final ink in which the particles are dispersed in the non-polar carrier liquid. As mentioned above, this may be desirable, for example, to decrease the non-volatile solids content of the ink. Additional non-polar carrier liquid may be added before or after the charge director is added, and may be added in an amount that is suitable for obtaining the desired NVS content of the final ink.

Referring now to the example of the method shown at reference numerals 100 and 114-120, after the mixture of the polymer resin and non-polar carrier liquid is formed, the mixture is ground with the pigment (see reference numeral 114). The grinding process (i.e., equipment used, conditions used, etc.) may be accomplished as previously described. It is to be understood that the pigment(s) may be selected from those previously described and may be added in an amount previously described. The grinding of the mixture with the pigment(s) results in the formation of the pigmented toner particles.

After grinding is complete, the charge director is added to the non-polar carrier liquid having the pigmented toner particles therein (as shown at reference numeral 116). It is to be understood that the charge director may be selected from those previously described and may be added in an amount previously described.

After the charge director is added, the metal oxide nanoparticle cores is added to the mixture containing the non-polar carrier fluid, the pigmented toner particles, and the charge director, as shown at reference numeral 118. It is to be understood that the metal oxide nanoparticle cores may be selected from those previously described and may be added in an amount previously described. Mixing is accomplished to form the polymer resin encapsulated metal oxide nanoparticles, as shown at reference numeral 120. In one example, mixing is accomplished for a time ranging from about 15 hours to about 20 hours. In this example, it is believed that excess polymer resin is present in the non-polar carrier liquid after grinding takes place. More particularly, it is believed that mixing causes hot spots to form between the surface groups of the metal oxide nanoparticle cores and the surface groups of the polymer resin(s). As described herein, the heat is believed to initiate a chemical reaction between the respective surface groups, which can result in hydrogen bonding between the groups. The hydrogen bonds attach the polymer resin(s) to the metal oxide nanoparticle cores to form the polymer resin encapsulated metal oxide nanoparticles.

Using any of the examples of the method shown in FIG. 1 results in the formation of the polymer resin encapsulated metal oxide nanoparticles. In an example, these encapsulated nanoparticles have an average particle size ranging from about 0.5 µm to about 5 µm. In another example, the encapsulated nanoparticles have an average particle size up to about 10 µm.

In the examples disclosed herein, the ink may also include a mixture of a variety of different agents, such as surfactants, co-solvents, buffers, biocides, sequestering agents, compatibility agents, antifoaming agents, oils, emulsifiers, viscosity modifiers, etc. These agents may be added at any time throughout the process and in any suitable amount.

The ink disclosed herein may be included in an ink set used in an electrophotographic printer. The ink set may include one ink, or any desirable number of inks. When multiple inks are included, each of the inks may have a different color.

To further illustrate the present disclosure, examples are given herein. It is to be understood that these examples are provided for illustrative purposes and are not to be construed as limiting the scope of the disclosure.

EXAMPLES

Six ink formulations with three different types of nanoparticles (i.e., ZnO, ITO and $ZrO_2$) were made. Cyan ElectroInk (EI) 4.5 (available from Hewlett Packard) was diluted to 10 wt % with ISOPAR® L. 2 wt % or 5 wt % of the respective particles were added to the diluted EI, and these mixtures were mixed for 18 hours. EI 4.5, without any metal oxide nanoparticles added thereto, was used as the control.

Approximately 1 mL of each ink was spread onto a piece of Ultra Sterling digital paper with a wired rod to form an ink film. The developed film was subjected to thermal fusing at 105° C. for about 3 minutes and was then allowed to cool. The fused ink films were then subjected to the linear scratch test with WEARASERS® CS10 (standard) and H18 (strong abrasive). The scratch tests were performed 10 times (10×), 20 times (20×), or 10 times with additional weight (10×+wt).

Figure 2:
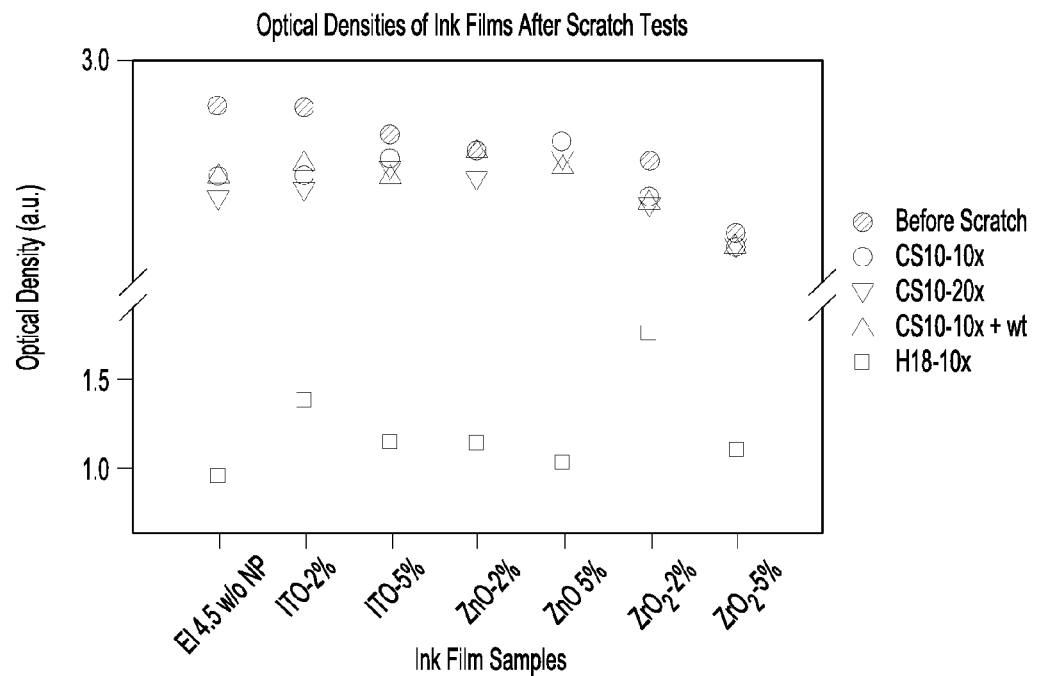
FIG. 2 a graph depicting the optical densities of ink films after a scratch test.

The optical densities of the control versus the inks having metal oxide nanoparticles added thereto are plotted in FIG. 2. The optical density results are for the inks i) before linear scratch testing was performed, ii) after a linear scratch test using CS10 for 10× was performed, iii) after a linear scratch test using CS10 for 20× was performed, iv) after a linear scratch test using CS10 for 10×+wt was performed, and v) after a linear scratch test using H18 for 10× was performed. The optical densities were determined by taking an average of 10 data points collected by measuring the color density with a densitometer. The values have no unit and are compared qualitatively.

Figure 3:
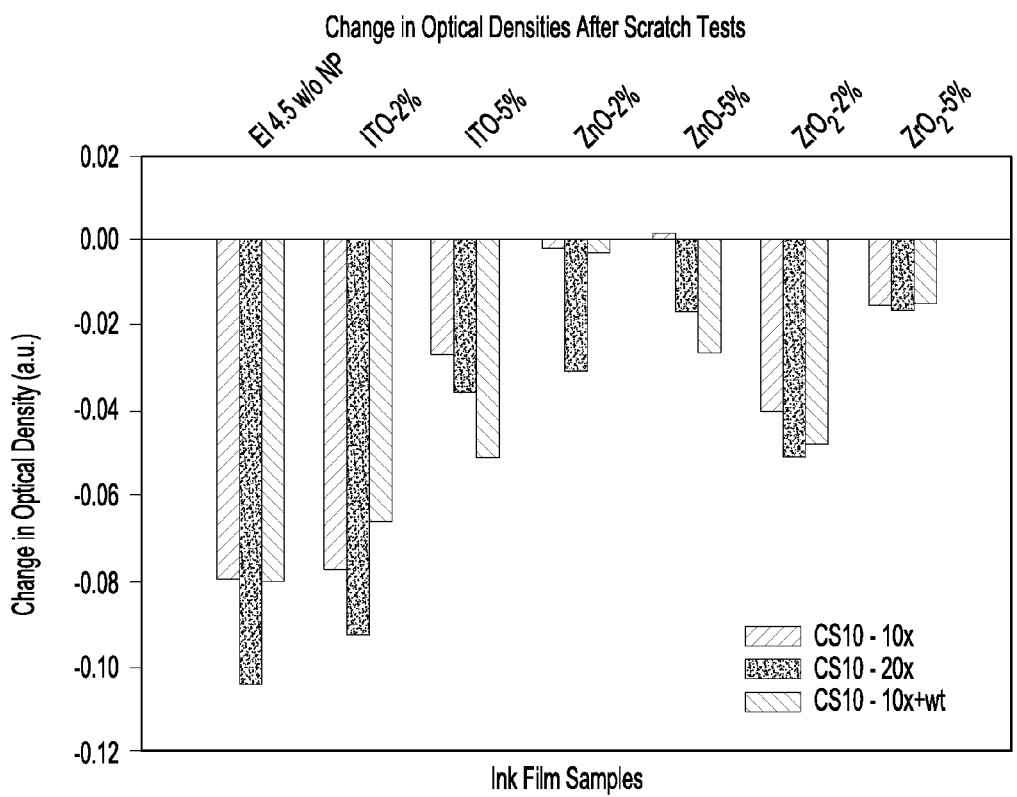
FIG. 3 is a graph depicted the change in optical densities of ink films after a scratch test.

The scratch resistance results were numerically characterized by determining the decrease in optical densities after the scratch tests. These results are shown in FIG. 3. Those samples having the least decrease in optical density exhibited the best resistance against scratch. As illustrated in FIG. 3, scratch resistance is noticeably enhanced upon incorporation of the nanoparticles. In particular, scratch resistance is significantly improved for the inks containing 2 wt % ZnO, 5 wt % ZnO, and 5 wt % $ZrO_2$.

Figure 4A:
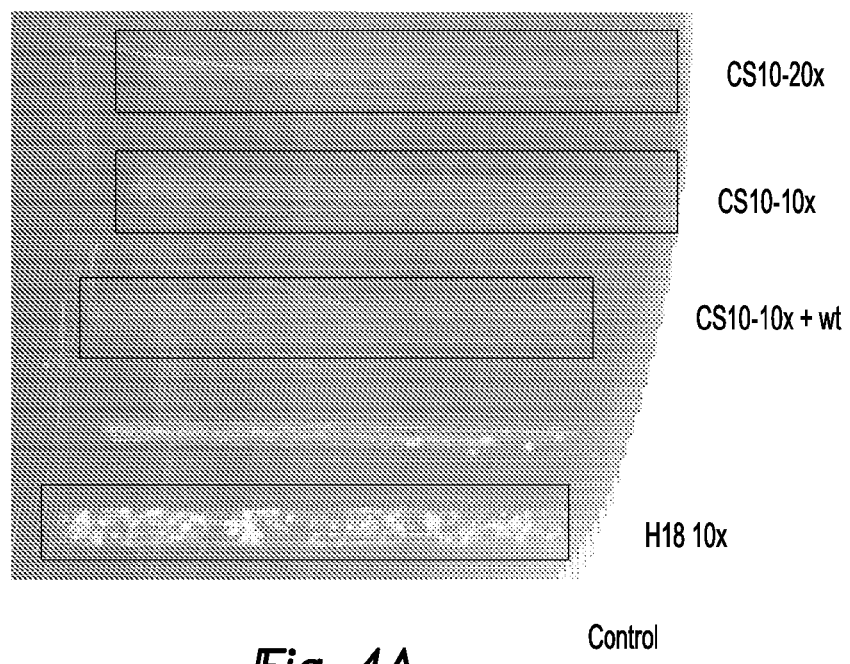
FIGS. 4A through 4G are images of ink films after a scratch test.
Figure 4B:
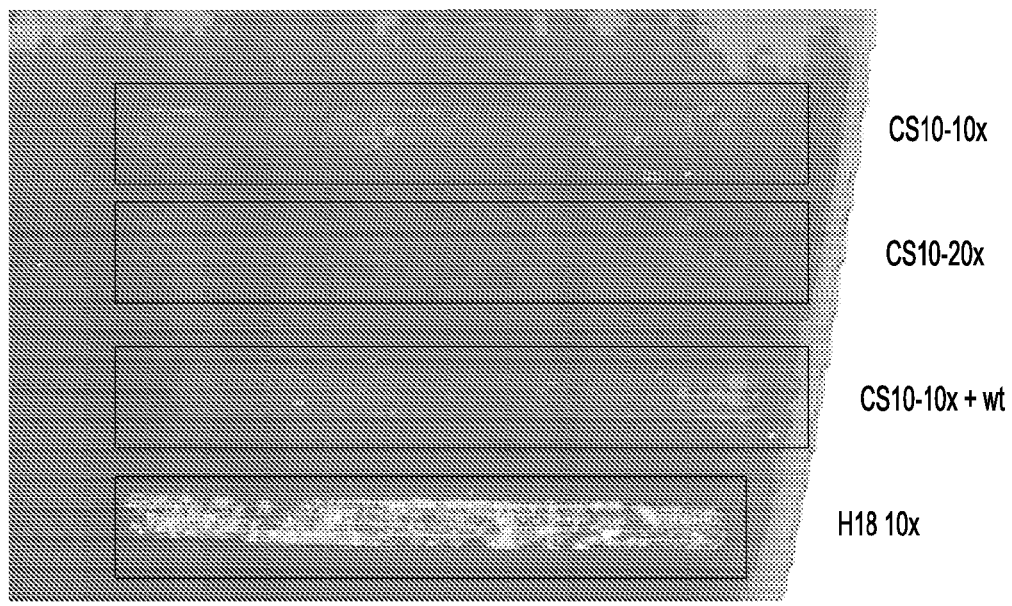
Figure 4C:
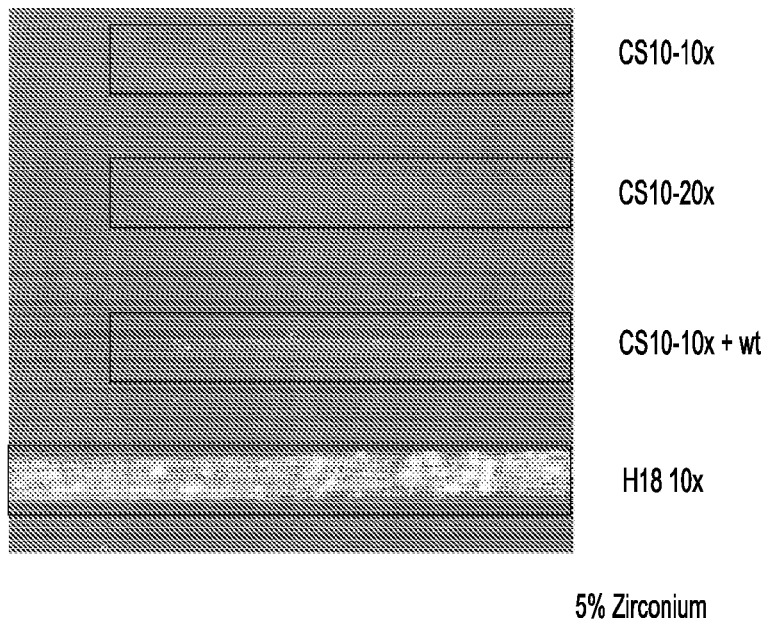
Figure 4D:
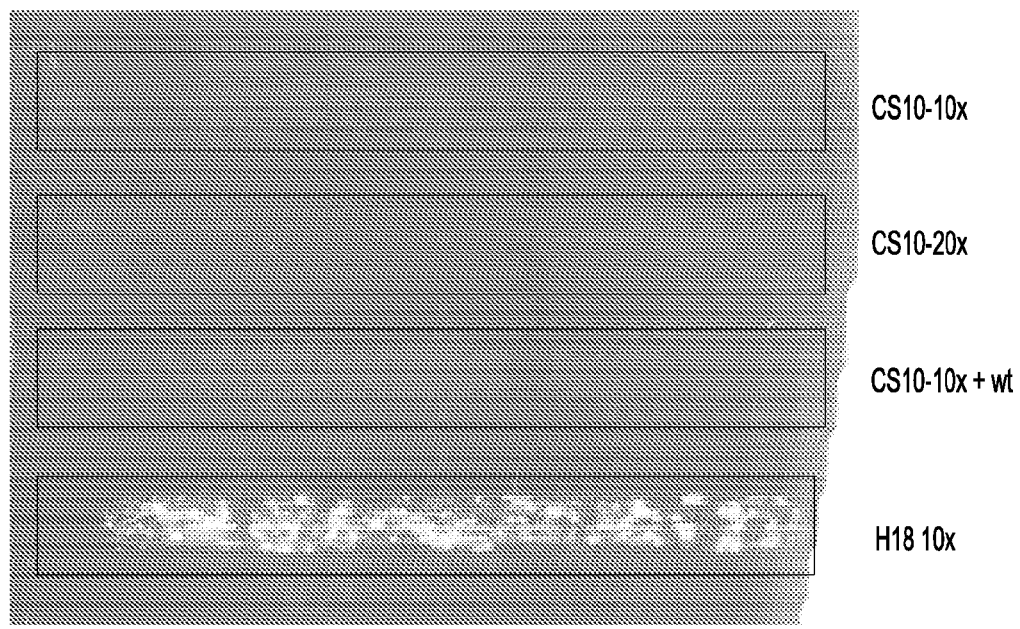
Figure 4E:
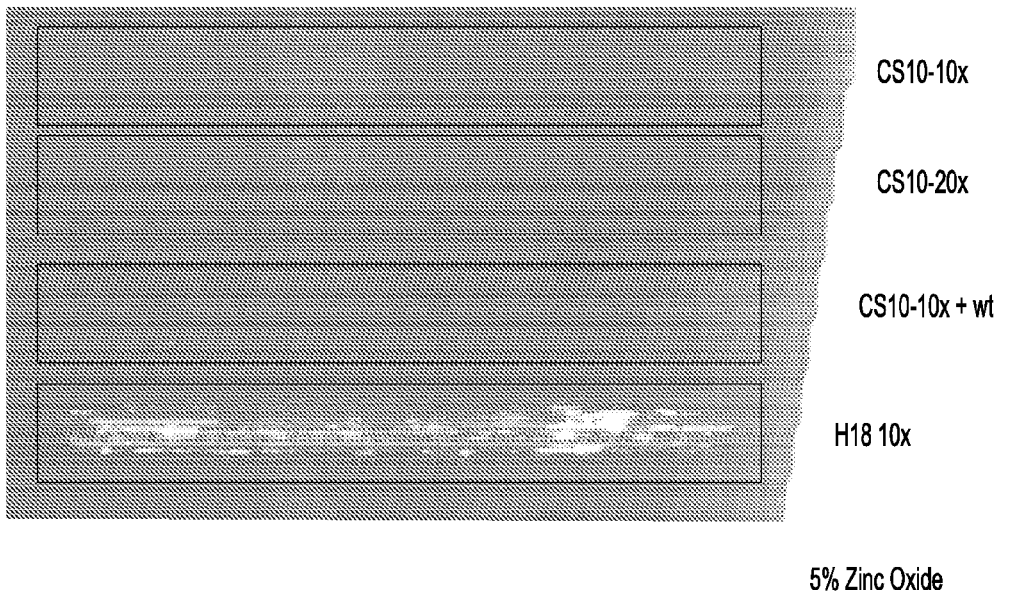
Figure 4F:
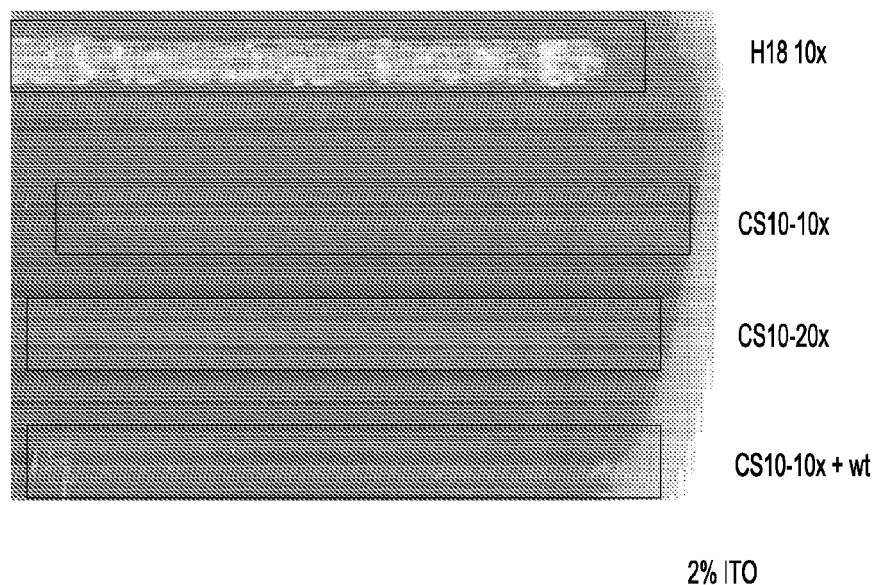
Figure 4G:
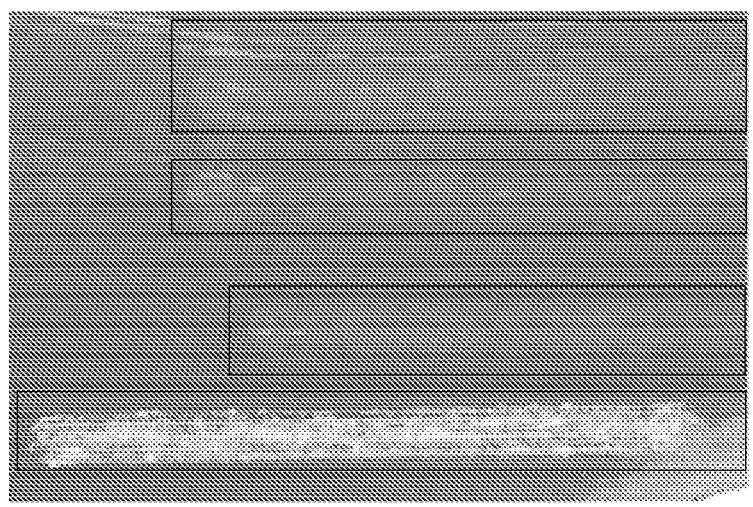

All of the formulations containing 2 wt % or 5 wt % nanoparticles showed enhancement in scratch resistance compared to the control when CS10 was used. Images of the scratch resistance results are shown in FIGS. 4A through 4G. The key along the right side of each figure identifies the WEARASERS® that was used in the linear scratch test. As shown in FIG. 4D, the sample containing 2 wt % ZnO exhibited the best resistance against CS10. As shown in FIGS. 4B and 4C, the samples containing 2 wt % $ZrO_2$ and 5 wt % $ZrO_2$ exhibited the best resistance against H18.

Concentrations, amounts, and other numerical data may be expressed or presented herein in a range format. It is to be understood that such a range format is used for convenience and brevity and thus should be interpreted flexibly to include not only the numerical values explicitly recited as the limits of the range, but also to include the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values, such as 2, 3.5, 4, etc., and sub-ranges, such as from 1 to 3, from 2 to 4, and from 3 to 5, etc. This same principle applies to ranges reciting a single numerical value (e.g., up to X). Furthermore, such an interpretation should apply regardless of the breadth of the range or the characteristics being described.

While several examples have been described in detail, it will be apparent to those skilled in the art that the disclosed examples may be modified. Therefore, the foregoing description is to be considered non-limiting.

What is claimed is:

1. A liquid electrophotographic ink, comprising:
   a non-polar carrier liquid;
   pigmented toner particles;
   a charge director; and
   polymer resin encapsulated metal oxide nanoparticles.

2. The liquid electrophotographic ink as defined in claim 1 wherein each of the polymer resin encapsulated metal oxide nanoparticles includes:
   a metal oxide nanoparticle core; and
   a polymer resin coating formed on the metal oxide nanoparticle core.

3. The liquid electrophotographic ink as defined in claim 2 wherein the metal oxide nanoparticle core is chosen from zinc oxide, indium tin oxide, zirconium oxide, aluminum oxide, and mixtures thereof.

4. The liquid electrophotographic ink as defined in claim 2 wherein the polymer resin coating is formed of a thermoplastic polymer.

5. The liquid electrophotographic ink as defined in claim 4 wherein the thermoplastic polymer includes COOH surface groups that react with hydroxyl groups of the metal oxide nanoparticle core.

6. The liquid electrophotographic ink as defined in claim 2 wherein each of the polymer encapsulated metal oxide nanoparticles has an average particle size ranging from about 10 nm to about 200 nm.

7. The liquid electrophotographic ink as defined in claim 1 wherein electrical properties of the liquid electrophotographic ink are unaffected by the polymer resin encapsulated metal oxide nanoparticles.

8. The liquid electrophotographic ink as defined in claim 1 wherein the pigmented toner particles include a pigment and a polymer resin associated with the pigment.

9. A method for making a liquid electrophotographic ink, comprising:
   mixing a polymer resin with a non-polar carrier liquid to form a mixture;
   grinding the mixture with a pigment to form pigmented toner particles in the non-polar carrier liquid;
   after the pigmented toner particles are formed, adding a charge director to the non-polar carrier liquid to impart a charge on the pigmented toner particles;
   adding metal oxide nanoparticle cores i) during the mixing step, or ii) during the grinding step, or iii) after the pigmented toner particles are formed; and
   processing the metal oxide nanoparticle cores and the polymer resin to form polymer resin encapsulated metal oxide nanoparticles.

10. The method as defined in claim 9, further comprising choosing the metal oxide nanoparticle cores from zinc oxide, indium tin oxide, zirconium oxide, and mixtures thereof.

11. The method as defined in claim 9, further comprising incorporating the metal oxide nanoparticle cores in an amount ranging from about 0.5 wt % to about 5 wt % with respect to a total weight of the liquid electrophotographic ink.

12. An ink set, comprising:
   at least two inks, each of which includes:

a non-polar carrier liquid;
pigmented toner particles;
a charge director; and
polymer resin encapsulated metal oxide nanoparticles.

13. The ink set as defined in claim 12 wherein each of the polymer resin encapsulated metal oxide nanoparticles includes:
a metal oxide nanoparticle core chosen from zinc oxide, indium tin oxide, zirconium oxide, and mixtures thereof; and
a thermoplastic polymer resin coating formed on the metal oxide nanoparticle core.

14. The ink set as defined in claim 13 wherein the metal oxide nanoparticle core has a hardness greater than a hardness of the thermoplastic polymer resin coating.

* * * * *